United States Patent [19]

Ettinger

[11] Patent Number: 4,792,655
[45] Date of Patent: Dec. 20, 1988

[54] STUD WELDING SYSTEM FEEDING DEVICE

[75] Inventor: Donald H. Ettinger, Royal Oak, Mich.

[73] Assignee: Emhart Industries, Inc., Farmington, Conn.

[21] Appl. No.: 110,998

[22] Filed: Oct. 20, 1987

[51] Int. Cl.⁴ .............................. B23K 9/20
[52] U.S. Cl. ..................................... 219/98
[58] Field of Search ............................. 219/98, 99, 103

[56] References Cited

U.S. PATENT DOCUMENTS

| | | | |
|---|---|---|---|
| 3,303,318 | 2/1967 | Spisak | 219/98 |
| 3,539,758 | 10/1970 | Ettinger | 219/98 |
| 3,546,420 | 12/1970 | Ettinger | 219/98 |
| 3,582,602 | 6/1971 | Ettinger | 219/98 |
| 3,597,572 | 8/1971 | Ettinger | 219/98 |
| 3,597,573 | 8/1971 | Ettinger | 219/99 |
| 3,679,860 | 7/1972 | Spisak | 219/98 |
| 3,694,611 | 9/1972 | Ettinger | 219/98 |
| 3,723,700 | 3/1973 | Ettinger | 219/98 |
| 4,137,445 | 1/1979 | Ettinger | 219/98 |
| 4,163,888 | 8/1979 | Ettinger | 219/98 |
| 4,284,870 | 8/1981 | Ettinger | 219/99 |
| 4,469,928 | 9/1984 | Wilkinson et al. | 219/98 |
| 4,513,193 | 4/1985 | Ettinger | 219/98 |

*Primary Examiner*—Clifford C. Shaw
*Attorney, Agent, or Firm*—Thomas S. Szatkowski

[57] ABSTRACT

A connector assembly for a stud welding device is provided. The connector assembly facilitates removal of jammed studs and prevents studs from shooting out of the feed tube when the assembly is removed.

2 Claims, 2 Drawing Sheets

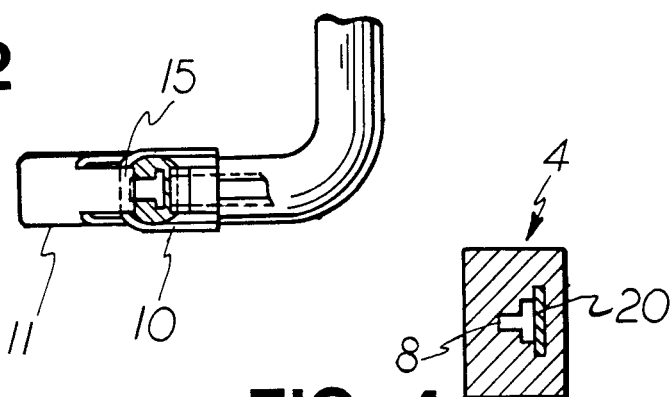
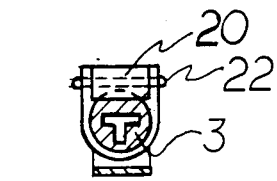
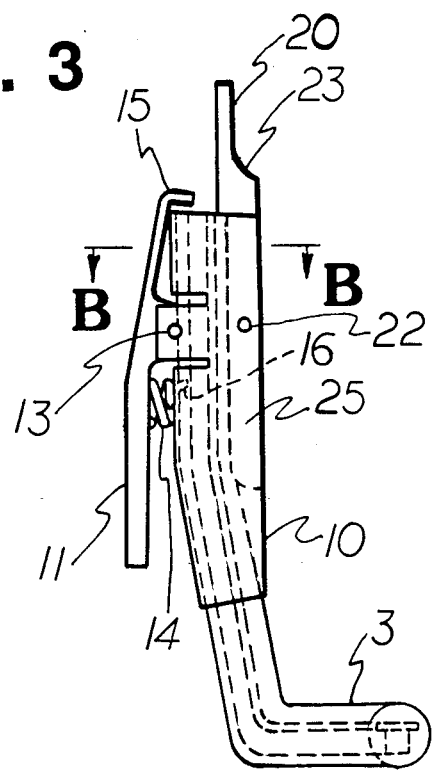
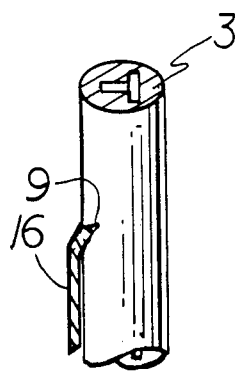

STUD WELDING SYSTEM FEEDING DEVICE

BACKGROUND OF THE INVENTION

1. Field of the Invention

The invention relates to automatic stud welding devices wherein a headed stud is fed to a retaining collet on a gun, and more particularly, to a feed tube assembly which facilitates the removal of jammed studs from such devices and which provides additional safety features.

2. Description of the Prior Art

Various stud welding devices are known in which headed studs, commonly referred to as tee studs, are fed by pneumatic pressure to a collet or stud holding device which retains the stud for welding. Devices of this type are disclosed in U.S. Pat. Nos. 3,582,602, 3,597,573, 3,539,758, 4,263,888 and 4,284,870. In such devices, there is usually provided a metallic rod which is aligned with the collet and serves to force the stud into the collet and apply a force to the head of the stud during the welding operation.

For this reason, the stud must generally be fed into the conduit leading to the collet from a path which intersects the axis of the collet. It is therefore been found advantageous to feed the stud in a direction normal to the axis of the collet along a path which terminates in the circular bore or conduit, commonly referred to as the receiver, leading to the collet. It is generally at this point that jamming in the device will occur, if at all, due to the change in direction of the stud from a path perpendicular to the axis of the collet to a path normal to its axis.

Stud welding devices are now used on robot and machine tool applications, which means that continued operaton is necessary. The purity of the feeding of studs to the device must be continued. If there is a jam of the stud in the feeding passageway in the receiver, it must be cleared as soon as possible. When jamming occurred in prior art stud welding devices, it was generally necessary that the gun be taken out of service and a new one substituted for it, as the gun generally must be disassembled with appropriate tools in order to unjam the feed-path of the stud. This procedure is inappropriate for devices utilized in robot application.

One solution to the jamming problem is disclosed in U.S. Pat. No. 4,137,445. This patent describes a two part receiver block with one part being fixed and the other being pivotally attached to, or completely removable from, the first part. Jammed studs could be removed by pivoting or detaching the movable portion. This solution to the jamming problem, however, has not been completely satisfactory; first, because the two part receiver is costly to manufacture and second, because the device is covered and cased in such a way that time consuming disassembly must occur before the jam can be cleared. Moreover, this device does not address the safety problem of studs which are fed by compressed air shooting out of the feeding tube upon removal of a jammed stud or upon disconnection of the feeding tube.

It is therefor an object of the present invention to provide a stud welding device having a removable feed tube assembly which facilitates removal of jammed studs from the device. It is another object of the present invention to provide a stud welding device having, as a safety feature, the ability to prevent studs from shooting out of the feeding tube upon disconnection of the feeding tube, or when a jam has been cleared.

SUMMARY OF THE INVENTION

It has now been found that the above objects are accomplished by a connector assembly comprising a connector which surrounds the feed tube and has a receiver insert attached thereto, the receiver insert being shaped to provide one wall of the continuing passageway of the receiver, and a lever mounted on the connector assembly for connection of the assembly to the receiver and for preventing studs from coming out of the feed tube when the assembly is removed.

BRIEF DESCRIPTION OF THE DRAWINGS

FIG. 2 is a top view of the feeding tube assembly of the present invention.

FIG. 3 is a side view of the feeding tube assembly of the present invention detached from the stud welding device.

FIG. 4 is a sectional view taken along line AA of FIG. 1.

FIG. 5 is a sectional view taken along line BB of FIG. 3.

FIG. 6 is a side view of the feed tube showing the attaching member of the feeding tube assembly of the present invention.

DESCRIPTION OF THE PREFERRED EMBODIMENT

Figure 1:
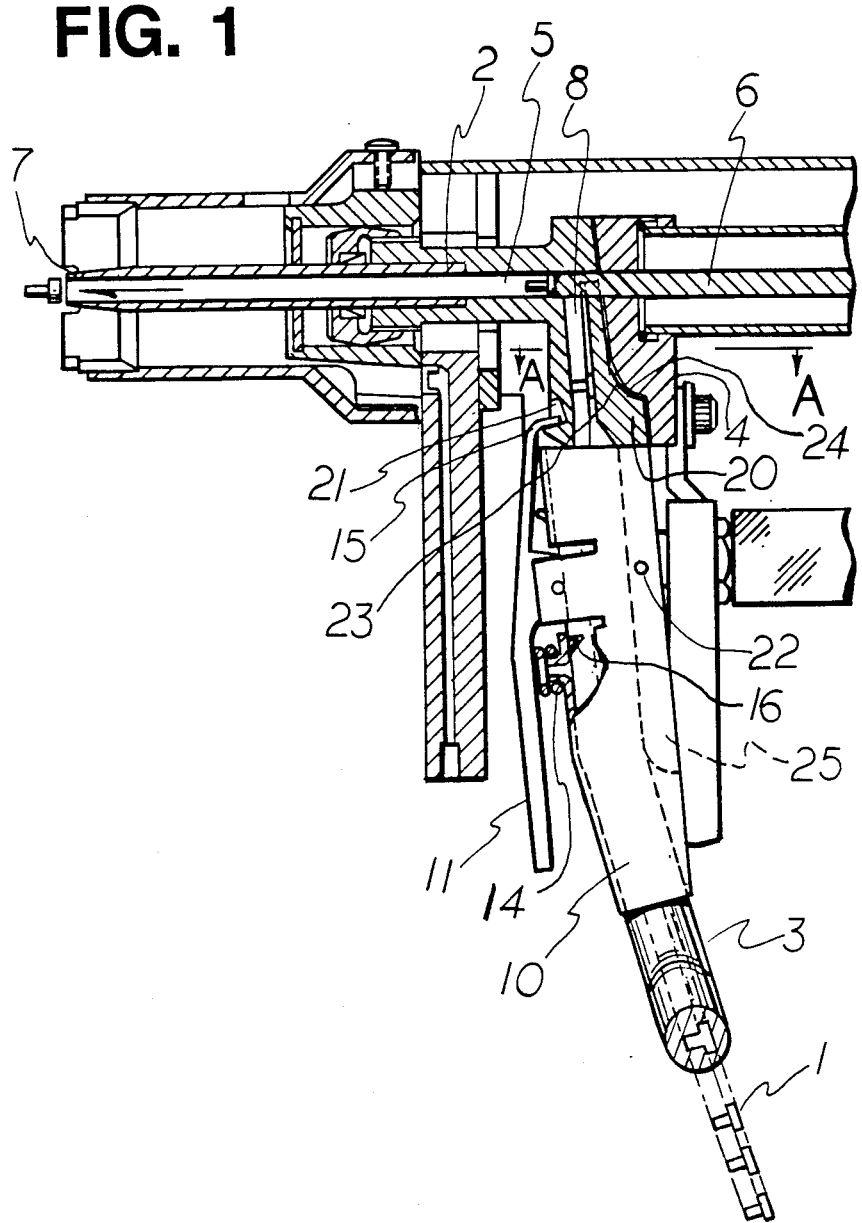
FIG. 1 is a fragmental side view, partially in section, showing a portion of a stud welding device having the invention embodied therein.

Headed stud 1, commonly referred to as a tee stud, is fed to the stud welding device as follows; from the feeder (not shown), the stud passes through a flexible conduit 3, referred to as a feed tube or hose, by means of compressed air. The stud exits the feed hose 3 and enters the receiver 4, which contains continuing T-shaped passageway 8. The stud then enters axial passageway 5, from which position it is fed to collet 2 by means of piston rod 6. Piston rod 6 pushes the stud along the axial passageway to the mouth 7 of collet 2 at which position the stud is welded to the appropriate substrate. It is at the intersection of the continuing passageway 8 and axial passageway 5 that most jams occur.

The present invention provides a feed tube connector assembly into which the feed tube 3 fits. Connector 10 surrounds the feed tube 3. To prevent slippage, finger 16 fits into notch 9 in the feed tube. Connector 10 also has insert portion 20 pivotally attached thereto by pin 22. Receiver insert 20 is shaped to fit into receiver 4 of the stud welding device and defines one side of the passageway 8 therein. Passageway 8 is a a T-shaped passage through which the stud travels upon exiting the feeding tube. Insert portion 20 also provides a positive locator for ease in assembling the feed tube to the stud welding device. Insert 20 is held in correct alignment by feed tube 3 and pin 22. Feed tube 3 contacts tail end 25 of insert 20 inside connector 10. Insert 20 is also held in place by surface 23 which congruently fits shoulder 24 of receiver 4.

The pivotal mounting of insert 20 acts to prevent breakage of the feed tube. If any abnormal load is put on the assembly when it is being removed inset 20 will pivot on pin 22. This action will compress feed tube 3 and utilize it like a spring. Breakage is thus prevented because of the resilient assembly.

Lever 11, generally of an inverted, L-shape, is pivotally mounted on connector 10 by pin 13, such that lip 15 will extend over and block the passageway through feed tube 3 when the tube has been removed from receiver 4. Otherwise, lip 15 is adapted to fit in aperture or slot 21 of receiver 4 and securely hold the connector to the receiver.

Connector 10 is provided with spring 14 to bias the handle portion of lever 11 away from the connector 10 and to bias lip 15 of lever 11 into slot 21 of receiver 4. In this manner the assembly is securely held in place. Unlatching the feed tube connector assembly from the receiver 4 will allow the withdrawal of the insert member 20 from the receiver 4. In doing so, part of the passageway 8 which is necessary to guide the tee stud has been removed. This action will then allow a stud that is lodged in passageway 8 or conduit 5 to fall out. Most jams are caused by irregular or damaged edges on the head portion of the tee stud. Therefore, if the area of passageway 8 which contacts the head of the tee stud is removed, the stud will drop out of and clear the tool for further use.

Feed tube 3, if removed from its attachment in the welding device, can be a hazard to those persons near its use. The feed tube is still connected to the feeder so studs can be cycled throughout this tube. This allows the free end to dispense the stud out of the tube at a high velocity. This condition is prevented by the connector assembly of the present invention. It will be noted that lip 15, of lever 11, when in the free condition as shown on FIG. 3, blocks the free end of the feed tube. This allows the connector assembly to add a safety feature to the system. In addition, the configuration of connector 10 and lever 11 safeguard against any breakage of the disconnected feed tube end caused by careless handling.

I claim:

1. In a device for arc welding headed studs to a work surface wherein headed studs are fed seriatum from a feed tube through a receiver to a stud retaining collet, the improvement which comprises:
   a feed tube connector assembly comprising a connector which surrounds said feed tube;
   a receiver insert pivotally mounted on said connector, said insert being shaped to fit into said receiver and provide a portion of a continuing passageway for said studs, a lever pivotally mounted to said connector, said lever having a lip which fits into a slot in said receiver to secure said assembly thereto and a spring attached to said connector and said lever adapted to bias said lip into said slot.

2. The device of claim 1 wherein said connector assembly further comprises a finger which fits into a notch in said feed tube.

* * * * *